(12) United States Patent
Douce et al.

(10) Patent No.: US 7,560,508 B2
(45) Date of Patent: Jul. 14, 2009

(54) ANTI-SCRATCH COATING COMPOSITION CONTAINING ANISOTROPIC PARTICLES, A CORRESPONDING COATED SUBSTRATE AND ITS APPLICATION IN OPHTHALMIC OPTICS

(75) Inventors: Jérôme Douce, Paris (FR); Frédéric Chaput, Lyon (FR); John Biteau, Saint Maur des Fosses (FR); Gilles Hochstetter, Bernay (FR)

(73) Assignee: Essilor International Compagnie Generale d'Optique, Charenton-le-Pont (FR)

( * ) Notice: Subject to any disclaimer, the term of this patent is extended or adjusted under 35 U.S.C. 154(b) by 769 days.

(21) Appl. No.: 10/912,283

(22) Filed: Aug. 5, 2004

(65) Prior Publication Data

US 2005/0142350 A1    Jun. 30, 2005

(30) Foreign Application Priority Data

Aug. 5, 2003    (FR) .................................. 03 50397

(51) Int. Cl.
*C08L 83/04* (2006.01)
(52) U.S. Cl. .................................. 524/588; 106/287.16
(58) Field of Classification Search .................. 524/588; 106/287.16
See application file for complete search history.

(56) References Cited

U.S. PATENT DOCUMENTS

| | | | |
|---|---|---|---|
| 4,211,823 A | 7/1980 | Suzuki et al. | ................ 428/412 |
| 5,015,523 A | 5/1991 | Kawashima et al. | ......... 428/336 |
| 5,316,791 A | 5/1994 | Farber et al. | ................. 427/464 |
| 5,403,513 A | 4/1995 | Sato et al. | .................... 252/309 |
| 5,407,600 A | 4/1995 | Ando et al. | ............... 252/313.1 |
| 5,741,831 A | 4/1998 | Keita et al. | ................... 523/106 |

FOREIGN PATENT DOCUMENTS

| | | | |
|---|---|---|---|
| EP | 0404111 | | 1/1995 |
| EP | 680492 | | 4/1997 |
| EP | 614957 | | 9/1997 |
| EP | 1245968 | | 6/2004 |
| FR | A 2734827 | | 12/1996 |
| JP | 59-078925 | | 5/1984 |
| JP | 63-087223 | | 4/1988 |
| JP | 63-141001 | | 6/1988 |
| JP | 63-225635 | | 9/1988 |
| JP | 06-264009 | * | 9/1994 |
| JP | 07133463 | | 5/1995 |
| JP | 08-231222 | * | 9/1996 |

* cited by examiner

*Primary Examiner*—Kuo-Liang Peng
(74) *Attorney, Agent, or Firm*—Fulbright & Jaworski L.L.P.

(57) ABSTRACT

Anti-scratch coating composition containing anisotropic particles, a corresponding coated substrate and its application in ophthalmic optics.

48 Claims, 2 Drawing Sheets

ANTI-SCRATCH COATING COMPOSITION CONTAINING ANISOTROPIC PARTICLES, A CORRESPONDING COATED SUBSTRATE AND ITS APPLICATION IN OPHTHALMIC OPTICS

BACKGROUND OF THE INVENTION

1. Field of the Invention

The present invention relates to the field of anti-scratch coatings for spectacle glass and more particularly anti-scratch coatings loaded with mineral particles.

2. Description of the Related Art

It is quite common, in the field of spectacle glasses, to use anti-abrasion and/or anti-scratch coatings to improve the surface properties of organic glasses.

Most coatings of this type are composed of alkoxysilane hydrolysates and in particular epoxysilane hydrolysates.

Colloidal loads, such as colloidal silica or mineral oxides, such as titanium oxide, zirconium oxide, tin oxide or antimony oxide, with high refraction index, are widely used in protective coatings for spectacle glasses. Their presence enables to reinforce the hardness of the grid formed by the epoxysilane matrix.

It is possible to incorporate such loads at high contents in the coating, i.e. up to approx. 50 to 60% in weight of dry matter of the coating.

Although the coated ophthalmic lenses available on the market are generally satisfactory, it is advisable to increase the hardness and the scratch-resistance properties of these existing coatings.

This problem is particularly delicate.

Indeed, the increase in the colloid ratio, which enables to reinforce the hardness of the coating, involves making said coating more rigid and more brittle, so that the gain obtained in hardness, does not translate, at high colloid ratios, by greater scratching resistance for the coating/substrate system, taken as a whole.

Besides, the incorporation of very high colloid quantities (more than 60% in weight) also brings about other shortcomings, such as for example cracking problems due to an expansion difference between the coat of mineral nature and the substrate, or of other coats, essentially organic in nature, applied previously to the surface of the spectacle glass.

The colloids used in the commercial coatings are colloids with globally isotropic particles, i.e. substantially spherical.

The synthesis of anisotropic colloids is known and their applications have been described in several patents or patent applications.

The patent U.S. Pat. No. 5,403,513 describes the synthesis $TiO_2$ colloids with anisotropic particles, with a form factor L/D varying from 1 to 20.6. (L being the length in the greater main axis of the particle and D the length in the shorter axis of the particle).

This document mentions that the colloid may be utilised as a surface coating material for transparent articles, made of mineral glass or plastics.

No specific formulation for the coating is described and it is the deposition of the sol only as a solution which is recommended.

The patent U.S. Pat. No. 5,407,600 describes nanoparticles whereof the length represents approx. 5 to 10 times the thickness thereof.

The patent mentions that the sols have a natural tendency to form films.

The Japanese patent JP 64941 (publication no. JP 63-225635) describes coatings resistant in particular to light degradation, usable on spectacle glasses and sun glasses.

The coatings include a thermosettable resin obtained from an organosilane which may be γ-glycidoxypropyltrimethoxysilane (Glymo) and non-agglomerated titanium dioxide particles whereof the form factor L/D varies from 1 to 10, and the particles are cubical or parallelepipedal in shape.

In the example 1 of this patent, the particles have a ratio L/D equal to 2.

Compared with a titanium colloid coating of conventional form factor, the UV-resistance is described as being considerably increased for the coating with the colloid of the patent.

The coating also shows good resistance to abrasion.

The Japanese patent JP 59-78925 describes an alumina sol comprising a pseudo-boehmite whereof the crystal is needled-shaped with diameter smaller than or equal to 10 millimicrons and 200 millimicrons in lengths.

The sol is introduced in films which are in fact PVA-films.

No optical application is mentioned.

The Japanese patent application JP 7133463 describes a composition for the preparation of a film which is transparent, hard and shows good adherence to a substrate comprising a hydrolysate of an organoalkoxysilane, a metal colloid, among other constituents.

The patent application mentions that the particles of the colloid may be spherical or cylindrical.

The colloid may be the Aluminasol® 100, 200 or 520.

There is no mention of the possible influence of the form factor of the particles.

The patent application published EP-1 245 968 describes a laminated article comprising a two-coat antiglare film comprising an outer layer applied on an inner layer comprising particles of a needle-shaped, mixed tin/antimony oxide. The inner layer is based on (meth)acrylate urethane.

It is specified that the needle shape includes forms of fibres, bars and columns.

These particles have an aspect ratio of 5 or more, preferably of 10 or more.

These particles are used at high contents (from 40 to 80% in weight) in the outer layer. The patent application EP-1 245 968 specifies that below 40% in weight, it is not possible to obtain good electrostatic and scratch-resistance properties.

Even if some of these documents suggest or recommend, in certain cases, the use of anisotropic particles in abrasion-resistant coatings, none of these documents suggest using very high form factor particles, i.e. greater than 10, in a polysiloxane-based coating.

SUMMARY OF THE INVENTION

One of the aims of the invention consists in providing polymerizable coating compositions leading to coatings whereof the scratch-resistance has improved over the coatings known until now.

Another aim of the invention is to provide polymerizable coating compositions leading to coatings whereof the scratch resistance is enhanced or equivalent to the anti-scratch coatings of the previous art, at lower contents in mineral loads, than in the coatings of the previous art.

The technical problems above are solved by an anti-scratch coating polymerizable composition comprising:
  a) at least one alkoxysilane and/or at least one hydrolysate thereof,
  b) anisotropic particles of at least one metal oxide and/or of at least one metal oxyhydroxide, each of the particles having a main axis and a length D1 following this main axis, smaller than or equal to 400 nm and whereof the sizes vary, in a direction transversal to said main axis, between a minimum dimension D2 and a maximum dimension D3, with D3≧D2, and c) optionally a polymerization catalyst, the ratios F=D1/D2 and f=D1/D3 defining the form factors of each anisotropic particle verify the relation F>10 and f≧10.

By main axis of an anisotropic particle according to the invention, is meant the medial axis of the particle in the direction of the greater length of such particle.

Preferably, the form factors of the anisotropic particles verify the following relation:

10<F≦50 and 10<f≦50.

Preferably, F≧15 and better still F≧20.

Optimally, F≧25, preferably F≧30, and better still F≧35.

As regards the form factor f, it is preferable that the former verifies the relation f≧20, and better f≧25.

The invention also relates to anisotropic particles of metal oxide and/or of metal oxyhydroxide, whereof each of them has a main axis, and a length D1 following this main axis, smaller than or equal to 400 nm and whereof the sizes vary, in a direction transversal to said main axis, between a minimum dimension D2 and a maximum dimension D3, with D3≧D2, characterized in that the ratios F=D1/D2 and f=D1/D3 defining the form factors of each of said anisotropic particles, verify the relation F>10 and f≧10.

The anisotropic particles having high form factors confer enhanced scratch-resistance for polysiloxane coatings containing said particles, with respect to these very coatings containing isotropic particles.

Generally, the length D1 of the anisotropic particles along the main axis varies from 100 to 300 nm, preferably from 140 to 300 nm, and better still from 140 to 200 nm.

It should be noted that the use of particles of such sizes departs from the usual recommendations in the ophthalmic field (for which one recommends generally sizes of the order of 50 nm or less).

In a preferred embodiment of the invention, F and f are substantially identical, and the preferred anisotropic particles are in the form of needles.

In a particularly preferred embodiment, the anisotropic particles are in the form of laths.

The metal oxides and/or oxyhydroxides forming the anisotropic particles of the invention may be of diverse natures, preferably in the form of a colloidal solution.

Preferably, the metal oxides and/or oxyhydroxides respond to the formula $M_aO_b(OH)_c$, wherein M designates a metal, a is an integer varying from 1 to 3, b is an integer varying from 1 to 4 and c is an integer varying from 0 to 4, with b+c≧1, preferably ≧2.

By way of examples, one may quote oxides and oxyhydroxides of the following elements: aluminum, zirconium, titanium, iron, antimony, tin, tungsten, vanadium and the mixtures thereof.

The metal oxides and the metal oxyhydroxides are generally selected in relation to their hardness, but also in relation to their refraction index, in order to suit the refraction index of the final coating composition containing said oxides and/or oxyhydroxides to that of the substrate whereon this composition is intended to be applied.

The synthesis method of the anisotropic particles of at least one metal oxide and/or metal oxyhydroxide is a hydrothermal synthesis method by hydrolysis of a hydrolysable metal precursor, and hydrothermal treatment.

Preferably, said anisotropic particles are particles of aluminum oxide, or better still of aluminum oxyhydroxide AlOOH.

The synthesis method will be described below for AlOOH.

Preferably, for the synthesis of AlOOH, a solution based on aluminum acylate, in particular based on basic aluminum acetate and on nitric acid in aqueous medium, is used.

The initial concentration of aluminum acetate is comprised between 0.1 mol.L$^{-1}$ and 0.5 mol.L$^{-1}$, preferably between 0.1 mol.L$^{-1}$ and 0.3 mol.L$^{-1}$.

The concentration of nitric acid $HNO_3$ is comprised between 0.5 and 2 mol.L$^{-1}$ and better of the order of 0.7 mol.L$^{-1}$.

The mixture is then placed in an autoclave at a temperature comprised between 150° C. and 200° C., preferably between 170° C. and 190° C., for a duration comprised between 1 hour and 24 hours.

The solution is then purified by dialysis. The aspect of the sol varies between slight diffusing to milky according to the duration of hydrolysis. The final concentration in mass of anisotropic particles in the sol is preferably comprised between 0.1% and 4% and better still between 0.7% and 1.5%.

The particles obtained, characterized by Electronic X-ray Transmission and Diffraction Microscopy, are boehmite crystalline anisotropic particles, γ-AlOOH, whereof the form factors, respectively F and f are comprised between F=40–f=40 and F=30–f=10. The greatest size D1 is comprised between 140 nm and 400 nm.

The sizes and form factors are determined by counting on Electronic Transmission Microscopy (ETM) as follows:

One applies a drop of colloid in order to cover an area of 20 mm$^2$ on a support adapted to ETM observation, one leaves the solvents evaporate, then three to five representative shots are taken, at enlargements varying from 20,000 to 100,000, randomly over the area aforementioned.

The sizes and form factors are then determined by statistic counting over a number of representative particles, comprised between 50 and 100, distributed over the shots.

In order to increase their solubility in the alkoxysilane and/or the hydrolysate thereof, the anisotropic particles are preferably subjected to a surface treatment.

Said treatment comprises a grafting step of at least one organo-functional alkoxysilane, preferably an epoxysilane and/or a (meth)acryloxysilane.

The preferred epoxysilanes are the same as those recommended for the preparation of the composition of anti-scratch coatings, as described below.

As organo-functional alkoxysilane, γ-glycidoxypropyl-trimethoxy-silane and/or (3-methacryloxy propyl)trimethoxy silane are recommended.

The initial mass ratio of the organo-functional alkoxysilane with respect to the metal oxide and/or the metal oxyhydroxide, in particular boehmite, is preferably comprised between 0.46 and 2.3, and better between 0.9 and 2.3.

Functionalisation is carried out in an organic solvent, preferably an alcoholic solvent, for example ethanol, for a duration of 3 to 24 hours, typically a preferential duration of 12 hours under reflux and energetic stirring.

Preferably, no catalyst is used during this step.

The solution may then be purified by dialysis or centrifugation.

After the grafting step, which creates a shell around nanoparticles, the mass of the nanoparticles, measured, for example, by thermogravimetric analysis, is generally increased by 10 to 40%, better by 10 to 30%.

The anisotropic particles according to the invention, notably in the form of a colloidal solution, do not form aggregates and are individualised correctly.

The following step consists in preparing a sol/gel composition wherein the anisotropic particles will be incorporated.

The sol is elaborated from at least one alkoxysilane such as an epoxysilane, preferably tri-functional, and/or a hydrolysate thereof, obtained for example by hydrolysis with a hydrochloric acid solution HCl. After the hydrolysis step, whereof the duration is generally comprised between 2 hours and 24 hours, preferably between 2 hours and 6 hours, one adds, optionally catalysts. A surfactant compound is preferably also added in order to promote the optical quality of the deposition.

The preferred epoxyalkoxysilanes comprise an epoxy grouping and three alkoxy groupings, the latter being linked directly to the silicium atom.

A preferred epoxyalkoxysilane may be an alkoxysilane carrying a β-(3,4-epoxycyclohexyl) grouping, such as β-(3,4-epoxycyclohexyl) ethyl-trimethoxysilane.

The particularly preferred epoxyalkoxysilanes respond to the formula (I):

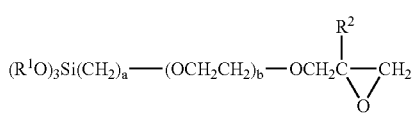

(I)

wherein:
$R^1$ is an alkyl grouping of 1 to 6 carbon atoms, preferably a methyl or ethyl grouping,
$R^2$ is a methyl grouping or a hydrogen atom,
a is an integer from 1 to 6,
b represents 0, 1 or 2.

Examples of such epoxysilanes are γ-glycidoxypropyl-triethoxysilane or γ-glycidoxypropyltrimethoxysilane.

One uses preferably γ-glycidoxypropyltrimethoxysilane.

As epoxysilanes, one may also use epoxydialkoxysilanes such as γ-glycidoxypropyl-methyldimethoxysilane, γ-glycidoxypropyl-methyldiethoxysilane and γ-glycidoxyethoxypropyl-methyldimethoxysilane.

But the epoxydialkoxysilanes are preferably used according to smaller ratios than the epoxytrialkoxysilanes aforementioned.

Other preferred alkoxysilanes respond to the following formula:

(II)

a formula wherein $R^3$ and $R^4$ are selected among the alkyl, methacryloxyalkyl, alkenyl and aryl groups, substituted or not (examples of substituted alkyl groupings are the halogenated alkyls, notably chlorinated or fluorinated); Z is a alkoxy, alkoxyalkoxy or akyloxy group; c and d represent 0, 1 or 2, respectively; and c+d represents 0, 1 or 2. This formula includes the following compounds: (1) tetraalkoxysilanes, such as methylsilicate, ethylsilicate, n-propylsilicate, isopropylsilicate, n-butylsilicate, sec-butylsilicate, and t-butylsilicate, and/or (2) trialkoxysilanes, trialkoxyalkoxysilanes or triacyloxysilanes, such as methyltrimethoxysilane, methyltriethoxysilane, vinyltrimethoxysilane, vinyltriethoxysilane, vinyltri-methoxyethoxysilane, vinyl-triaketoxysilane, phenyltrimethoxysilane, phenyl-triethoxysilane, γ-chloropropyl-trimethoxysilane, γ-trifluoropropyltrimethoxy-silane, methacryloxypropyl-trimethoxysilane, and/or (3) dialkoxysilanes, such as: dimethyldimethoxysilane, γ-chloropropylmethyldimethoxysilane and methylphenyldimethoxysilane.

If a hydrolysate of alkoxysilane(s) is used, the former is prepared in a manner known of itself.

The techniques exposed in the patent EP-614 957 and U.S. Pat. No. 4,211,823 may be used.

The silane hydrolysate is prepared by adding water or a solution of hydrochloric acid or of sulphuric acid to the silane(s). It is also possible to carry out the hydrolysis without adding solvents and by using simply the alcohol or the carboxylic acid formed during the reaction between the water and the alkoxysilane(s). One may also substitute these solvents with other solvents, such as alcohols, ketones, alkyl chlorides and aromatic solvents.

The hydrolysis with an aqueous solution of hydrochloric acid is preferred.

On top of the alkoxysilanes, the solution may also comprise other particles of metal oxide or of metal oxyhydroxide, or of silica, not showing the form factors of the particles according to the invention. They may be, in particular, globally isotropic particles.

Examples of such particles are silica particles, or high refraction index particles such as titanium or zirconium oxide particles.

One adds then in the sol/gel composition prepared previously the grafted particles of metal oxide and/or of metal oxyhydroxide, in particular boehmite particles, stabilised in ethanol, in order to obtain a requested mass loading ratio (preferably between 0.1% and 39% in mass with respect to the mass of TDE (theoretic dry extract) in anisotropic particles according to the invention in the coating composition).

The sol/gel composition comprises preferably at least one hardening catalyst.

As examples of hardening catalysts, one may notably quote the aluminum compounds, and in particular the compounds of the aluminum selected among:

Aluminum chelates, and
The compounds of formulae (III) or (IV) detailed below:

(III)

(IV)

wherein:
R and R' are alkyl groupings with linear or branched chain with 1 to 10 carbon atom,
R" is an alkyl grouping with linear or branched chain of 1 to 10 carbon atom, a phenyl grouping, a group

where R has the meaning specified above, and n is an integer from 1 to 3.

As it is known, an aluminum chelate is a compound formed by reacting an aluminum alcoholate or acrylate with sequestering agents exempt from nitrogen and sulphur, containing oxygen as a coordination atom.

Aluminum chelate is preferably selected among the compounds of the formula (V):

$$AlX_vY_{3-v} \quad (V)$$

wherein:
X is an OL grouping where L is an alkyl grouping of 1 to 10 carbon atoms,
Y is at least one coordinate produced from a compound of the formula (1) or (2):

$$M^1COCH_2COM^2 \quad (1)$$

$$M^3COCH_2COOM^4 \quad (2)$$

wherein
$M^1$, $M^2$, $M^3$ and $M^4$ are alkyl groupings of 1 to 10 carbon atoms,
and v takes on the values 0, 1 or 2.

As examples of compounds of the formula (V), one may quote aluminum acetyl acetonate, aluminum ethylacetoacetate bisacetylacetonate, aluminum bisethylacetoacetate acetylacetonate, di-n-butoxyde monoethylacetoaluminum acetate and diipropoxyde mono-methylacetoaluminum acetate.

As compounds of the formula (III) or (IV), one selects preferably those for which R' is an isopropyl or ethyl grouping, and R and R" are methyl groupings.

Particularly advantageously, one will use preferably as a hardening catalyst of the composition, aluminum acetyl-acetonate, in a proportion of 0.1 to 5% of the total weight of the composition.

The compositions according to the invention may also comprise one or several additives, such as pigments, UV absorbers, photochromic colouring agents, anti-yellow agents, anti-oxidant agents.

The compositions of the invention, may contain, moreover, an organic solvent whereof, preferably, the boiling point, at atmospheric pressure, is comprised between 70 and 140° C.

As a usable organic solvent according to the invention, one may quote alcohols, esters, ketones, tetrahydropyrane, tetrahydrofurane and the mixtures thereof.

The alcohols are preferably selected among the lower alcohols (in $C_1$-$C_6$), such as methanol, ethanol and isopropanol.

The esters are preferably selected among the acetates, and one may quote in particular ethyl acetate.

The composition may also comprise one or several surfactants, in particular fluorinated or fluorosilicon surfactants, generally at the ratio of 0.001 to 1% in mass, preferably 0.01 to 1% in mass, with respect to the total mass of the composition. Among the preferred surfactants, one may quote the FLUORAD® FC430 marketed by 3M, the EFKA 3034® marketed by EFKA, the BYK-306® marketed by BYK and the Baysilone OL31® marketed by BORCHERS.

The theoretic dry extract of the coating composition comprises preferably from 0.1 to 39% in mass of anisotropic particles according to the invention, better from 3 to 35% in mass, and better still from 10 to 35% in mass.

The masse of theoretic dry extract (TDE) is the total calculated mass of solid matters from different constituents of the final coating composition.

By mass of solid matters derived from silanes is meant the calculated mass in Qk $SiO(4-k)/2$ unit wherein Q is an organic grouping linked directly to the silicium atom by a Si-C link and Qk $SiO(4-k)/2$ is derived from Qk Si R'''(4-k) or Si-R''' generates SiOH by hydrolytic treatment, and k designates 0, 1 or 2.

The mass of solid matter in anisotropic particles of metal oxide and/or of metal oxyhydroxide in the final coating composition is the mass of the particles of metal oxide and/or of metal oxyhydroxide, without taking into account the mass of their grafted shell.

By definition, when the functionalised anisotropic particles are integrated to the polysiloxane matrix of the coating, the organo-functional alkoxysilane constituting the shell of the particles is considered as integrating part of said matrix.

The following step consists in applying the composite varnish based on anisotropic particles.

Any conventional deposition method may be used.

One may quote the hardened deposition, a technique according to which the substrate to be coated is dipped into a bath of the composition, or the spin coating deposition.

The sol is deposited preferably by <<spin coating>>, on substrates, for example a Substrate ORMA®, of Essilor, based on poly(bisallyl glycol diethylen carbonate). The deposition speed is comprised between 100 rpm and 3000 rpm, preferably between 200 rpm and 2000 rpm.

The varnishes are then hardened, preferably by thermal treatment in a stove for 1 to 5 hours, typically 3 hours at a temperature comprised between 80° C. and 120° C.

The films obtained have typically a thickness of 1 to 10 microns, preferably of 2 to 5 microns.

The films according to the invention show excellent scratch-resistance.

In particular, the films show, when scratched by a diamond tip with a tip radius of 100 micrometers, a critical load greater than or equal to 7 Newtons (N), preferably greater than or equal to 9 N and better still greater than or equal to 11 N.

The coatings according to the invention may be applied on any appropriate substrate made of organic or mineral glass, for example ophthalmic lenses, in particular spectacle glasses, whereas these substrates may be bare or coated by one or several adherence coat, e.g. an abrasive resistant coating possibly deposited on a shock-absorbing primary coat and/or an adherence primary coat.

Among the organic glass substrates suitable for optical articles according to the invention, one may quote the polycarbonate substrates and those obtained by polymerization of alkyl methacrylates, in particular $C_1$-$C_4$ alkyl methacrylates such as methyl(meth)acrylate and ethyl(meth)acrylate, polyethoxylated aromatic (meth)acrylates such as polyethoxylated dimethacrylate bisphenolates, alkyl derivatives such as allyl carbonates of aliphatic or aromatic polyols, linear or branched, thio-(meth)acryliques, the polythiourethane, polycarbonate (PC) and polyepisulphur substrates.

Among the recommended substrates, one may quote substrates obtained by polymerization polyol carbonate allyls among which one may mention bis allyl carbonate ethyleneglycol, glycol bis 2-methyl carbonate diethylene, bis (allyl carbonate) diethyleneglycol, bis (2-chloro allyl carbonate) ethyleneglycol, bis (allyl carbonate) triethyleneglycol, 1,3-propanediol bis (allyl carbonate), glycol bis (2-ethyl allyl carbonate) propylene, 1,3-butylenediol bis (allyl carbonate), 1,4-butenediol bis (2-bromo allyl carbonate), bis (allyl carbonate) dipropyleneglycol, bis (2-ethyl allyl carbonate) trimethyleneglycol, bis (allyl carbonate) pentamethyleneglycol, bis phenol-A bis (allyl carbonate) isopropylene.

The substrates particularly recommended are the substrates obtained by polymerization of bis allyl carbonate diethyleneglycol, sold under the trade designation CR 39® by PPG INDUSTRIE (lens ORMA® ESSILOR).

Among the substrates also recommended, one may quote the substrates obtained by polymerization of thio(meth) acrylic monomers, such as those described in the French patent application FR-A-2 734 827.

Obviously, the substrates may be obtained by polymerization of mixtures of the monomers above.

Before deposition, it is possible to activate the surface of the substrate by an appropriate treatment, such as plasma or corona treatment, or treatment by an aqueous acid or basic solution, in order to create reactive sites which will enable better adherence with the anti-scratch coating composition.

One may use as a shock-absorbing primary coat any shock-absorbing coat employed conventionally for a transparent polymer material, such as ophthalmic lenses.

Among the preferred primary compositions, one may quote the thermoplastic polyurethane based compositions, as described in the Japanese patents 63-141001 and 63-87223, the poly(meth)acrylic primary compositions, such as described in the Patent U.S. Pat. No. 5,015,523, the thermosetting polyurethane-based compositions, such as described in the Patent EP-0 404 111 and the latex poly(meth)acrylic-based compositions and polyurethane latex, such as described in the patent documents U.S. Pat. No. 5,316,791, EP-0 680 492.

The preferred primary compositions are the polyurethane-based compositions and the latex-based compositions, in particular the polyurethane latexes.

The poly(meth)acryliques latexes are copolymer latexes composed essentially by a (meth)acrylate, such as for example ethyl or butyl (meth)acrylate, or methoxy or ethoxyethyl (meth)acrylate, with a generally minor proportion of at least one other comonomer, such as for example styrene.

The preferred poly(meth)acrylic latexes are acrylate-styrene copolymer latexes.

Such acrylate-styrene copolymer latexes are available commercially with ZENECA RESINS under the designation NEOCRYL®.

The polyurethane latexes are also known and available commercially.

By way of example, one may quote the polyurethane latexes containing polyester patterns. Such latexes are also marketed by ZENECA RESINS under the designation NEOREZ® and by BAXENDEN CHEMICAL under the designation WITCOBOND®.

One may also use in the primary compositions mixtures of these latexes, in particular polyurethane latexes and poly (meth)acrylic latexes.

These primary compositions may be applied to the faces of the optical article by hardening or spin-coating, then dried at a temperature of at least 70° C. and possibly 100° C., preferably of the order of 90° C., for a duration of 2 minutes to 2 hours, generally of the order of 15 minutes, to form primary coats having thicknesses, after curing, of 0.2 to 2.5 µm, preferably 0.5 to 1.5 µm.

BRIEF DESCRIPTION OF THE DRAWINGS

The remainder of the description refers to the appended figures, which represent respectively.

Boehmite anisotropic particles, before functionalisation, having form factors F=30 and f=10 (anisotropic particles in the form of laths).

FIG. 2:

Boehmite anisotropic particles, before functionalisation, having form factors F=25 and f=25 (anisotropic particles in the form of needles).

FIG. 3:

a graph of the maximum critical load according to the coatings of the comparative examples 1, 2 and of the examples 1 and 2 of the invention.

DETAILED DESCRIPTION

The following examples illustrate the invention, by no way of limitation.

EXAMPLES

Example 1

Preparation of Films of
γ-glycidoxypropyl-trimethoxysilane (Glymo) Loads
with Boehmite Particles of Form Factors F=25, f=25,
Glymo Grafted 1.1. Synthesis of the Anisotropic Particles:

13.5 g of basic aluminum acetate (($CH_3CO_2$)$_2$AlOH, Aldrich, CAS 142-03-0) are mixed with 300 mL of distilled water and 1.89 mL of nitric acid ($HNO_3$ 70%, SdS, CAS 7697.37.2). The mixture is stirred for 10 min, then the whole is placed in an autoclave for the hydrothermal treatment. The duration of the treatment is 3 hours.

The solution thus obtained is dialysed for 48 hours in demineralised water.

The particles obtained are boehmite particles having the form factors F=25, f=25 for an average length of 180 nm.

Figure 2:
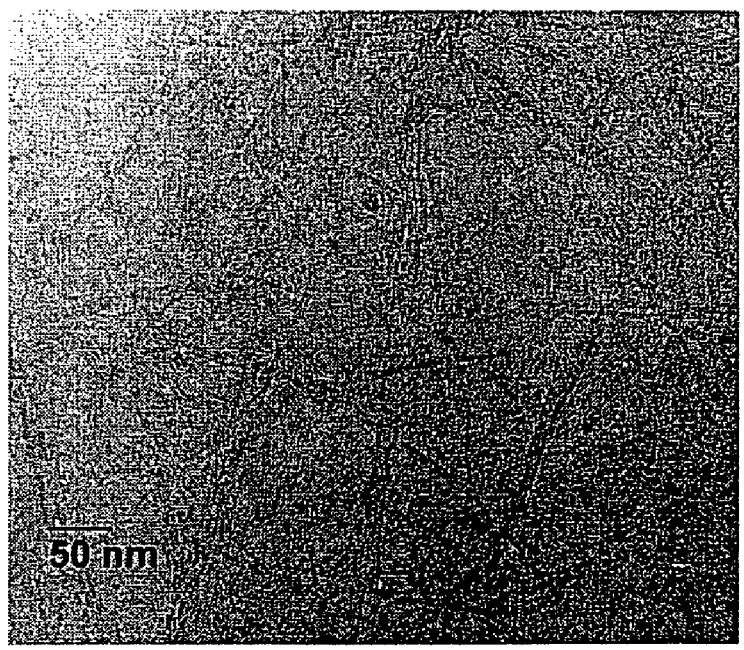

These particles are represented on FIG. 2.

1.2. Functionalisation of the Anisotropic Particles:

These particles are transferred in ethanol by successive spin-coating and re-dispersion operations (3 times 4000 revolution/minute for 30 minutes).

5.4 g boehmite are re-dispersed in 500 mL ethanol. Then 5 g γ-glycidoxypropyltrimethoxysilane (ALDRICH) are added. The solution is then refluxed and stirred for a further 12 h.

The solution thus obtained is purified by dialysis in ethanol, then concentrated to reach a 4%-mass dry extract. The solution is then reduced to a 3.5%-mass dry extract per addition of HMP (4-hydroxy, 4-methyl penta-2-one).

The dry extract, whereof the composition is determined by thermogravimetric analysis, comprises 83% in mass of aluminum oxyhydroxide for 17% in mass of grafted Glymo.

1.3. Preparation of the Sol/Gel and Incorporation of the Anisotropic Particles:

11.25 g of HCl 0.1 M are added drop by drop under stirring to 50 mL glycidoxypropyltrimethoxysilane. The temperature of the mixture does not exceed 40° C. The solution is then left for 2 hours under stirring.

One then adds 2g aluminum acetyl acetonate (Al(Acac)$_3$) and 2 mL 5%-mass surfactant EFKA 3034 in methanol. A hydrolysate ready for addition of the anisotropic particles is then obtained.

21 g of the boehmite solution are then added to 2 g of the hydrolysate previously described in order to prepare a final coating composition comprising 33% in mass of anisotropic particles with respect to the mass of the EST of this composition.

The solutions obtained are ultrasound-treated in order to optimise the dispersion of the colloids.

The substrate for deposition are ORMA® glasses (glycol diethylene based polymer) which have been subjected to the following treatment: soda 15% for 3 min., mains water 3 min., de-ionised water 3 min, and isopropyl alcohol 3 min.

The deposits of the final coating composition are then carried out by spin coating at 1200 rpm.

The films are cured for 3 hours at 120° C. The thickness obtained is 3.7 μm.

Example 2

Elaboration of Glymo Films Loaded with Boehmite Particles of of Form Factor F=30, f=110 Glymo Grafted 2.1. Synthesis of the Anisotropic Particles.

13.5 g of basic aluminum acetate (($CH_3CO_2$)$_2$AlOH, Aldrich, CAS 142-03-0) are mixed with 300 mL distilled water and 1,89 mL nitric acid ($HNO_3$ 70%, SdS, CAS 7697.37.2). The mixture is left to stir for a further 10 min, then the whole is placed in an autoclave for the hydrothermal treatment. The duration of the treatment is 24 hours.

The solution thus obtained is dialysed for 48 hours in demineralised water.

The particles obtained have a form factor F=30, f=10 for an average length of 180 nm.

Figure 1:
FIG. 1.

These particles are represented on FIG. 1.

2.2. Functionalisation of the Anisotropic Particles.

These particles are transferred in ethanol by successive spin-coating—re-dispersion operations.

5.4 g boehmite are re-dispersed in 500 mL ethanol. One adds then 12.5 g glycidoxypropyltrimethoxysilane (ALDRICH). The solution is then refluxed and stirred for a further 12 h.

The solution thus obtained is purified by dialysis in ethanol then concentrated to reach a 7%-mass dry extract.

The dry extract, whereof the composition is determined by thermogravimetric analysis, comprises 60% in mass of aluminum oxyhydroxide pour 40% in mass of Grafted Glymo.

2.3. Elaboration of the Sol/Gel and Incorporation of the Anisotropic Particles.

11.25 g HCl 0.1 M are added drop by drop under stirring at 50 mL glycidoxypropyltrimethoxysilane. The temperature of the mixture does not exceed 40° C. The solution is then stirred for a further 2 hours.

One then adds 2g of aluminum acetyl acetonate (Al(Acac)$_3$) and 2 mL 5% mass surfactant EFKA 3034 in methanol. A hydrolysate ready for addition of the nanoparticles is thus obtained.

20.8 g of the boehmite solution are then added to 2 g of the hydrolysate described previously in order to obtain a final coating composition comprising 33% in mass of anisotropic particles with respect to the mass of the EST of this composition.

The solutions obtained are ultrasound-treated in order to optimise the dispersion of the colloids.

The glasses ORMA® acting as a substrate for the deposition are subjected to the following treatment: soda 15% for 3 min., mains water 3 min., de-ionised water 3 min. and isopropyl alcohol 3 min.

The deposits of the final coating composition are then carried out by spin coating at 1200 rpm.

The films are cured 3 hours at 120° C. The thickness obtained is 3.7 μm.

Example 3

Elaboration of methyltriethoxysilane (MTEOS) Films Loaded with Boehmite Particles of Form Factor F=25, f=25 Grafted with (3-methacryl-oxypropyl)trimethoxysllane 3.1. Synthesis of the Anisotropic Particles.

13.5 g of basic aluminum acetate (($CH_3CO_2$)$_2$AlOH, Aldrich, CAS 142-03-0) are added with 300 mL distilled water and 1.89 mL nitric acid ($HNO_3$ 70%, SdS, CAS 7697.37.2). The mixture is left to stir for a further 10 min, then the whole is placed in an autoclave for the hydrothermal treatment. The duration of the treatment is 3 hours.

The solution thus obtained is dialysed for 48 hours in demineralized water.

The particles obtained have a form factor F=25, f=25 for an average length of 180 nm.

3.2. Functionalisation of the Boehmite Particles of Form Factor F=25, f=25 with (3-methacryloxypropyl)trimethoxysilane.

The boehmite particles synthesised previously are transferred in ethanol by successive spin-coating and re-dispersion operations.

1 gram Boehmite is re-dispersed in 160 ml ethanol. One adds then 2.7 g (3-methacryloxypropyl)trimethoxysilane (ALDRICH). The solution is then refluxed and stirred for a further 12 h.

The solution thus obtained is purified by dialysis in ethanol then concentrated to reach a 6%-mass dry extract. The dry extract, whereof the composition is determined by thermogravimetric analysis, comprises 60% in mass of aluminum oxyhydroxide for 40% in mass of grafted (3-methacryl-oxypropyl)trimethoxysilane.

3.3. Elaboration of a methyltriethoxysilane (MTEOS) Based Film Loaded with Boehmite Particles of Form Factor F=25, f=25 Grafted (3-methacryl-oxypropyl)trimethoxysilane.

216 mL water are adjusted to pH 3.8 by adding concentrated HCl. One ads then 120 mL MTEOS and it is left to stir overnight. The solution is concentrated by elimination of a portion of the water and of the ethanol then formed. The solution is left to decant for 72 hours. The supernatant is then sampled and the sol re-dissolved in ether oxide. It is left to decant and the ether is evaporated. The sol is then rinsed twice with tetrahydrofurane. One obtains then 120 mL MTEOS solution hydrolysed in the THF. The mass concentration of the sol is 591.5 $g.L^{-1}$.

6.5 g boehmite solution are then added to 1.18 g of the hydrolysate described previously a final coating composition containing anisotropic boehmite particles whereof the mass represents 20% of the mass of the TDE of this composition.

The solutions obtained are ultrasound-treated in order to optimise the dispersion of the colloids.

The glasses ORMA® acting as a substrate for the deposit are subjected to the following treatment: soda 15% for 3 min., mains water 3 min., de-ionised water 3 min, and isopropyl alcohol 3 min.

The deposits are then carried out by spin coating at 1500 rpm.

The films are cured for 3 hours at 120° C. The thickness obtained is 2.8 μm.

The following comparative examples have been implemented by using a commercial colloid Aluminasol®-200, marketed by Nissan.

Comparative Example 1

Elaboration of a Film Loaded with Non-Grafted Aluminasol®-200 Particles 11.25 g of HCl 0.1 M are added drop by drop under stirring at 50 ml glycidoxypropyltrimethoxysilane The temperature of the mixture does not exceed 40° C. The solution is then stirred for an additional two hours.

One adds then 2 g aluminum acetyl acetonate (Al(Acac)$_3$) and 2 ml 5%-mass EFKA 3034 surfactant in methanol. One obtains thus a hydrolysate A ready for the addition of the Aluminasol®.

The colloidal solution of Aluminasol®-200 is diluted in ethanol in order to obtain an 8%-mass dry extract.

6.5 g of this solution are added to 2 g of the hydrolysate A previously described in order to obtain a final coating composition having a 33% mass ratio of particles of Aluminasol® in the TDE of this coating composition.

The solutions obtained are ultrasound-treated in order to optimise the dispersion of the colloids.

The glasses ORMA® acting as substrates for the deposit are subjected to the following treatment: soda 15% for 3 minutes, mains water 3 minutes, de-ionised water for 3 minutes and isopropyl alcohol 3 minutes.

The deposits of the final coating composition are then carried out by spin coating at 330 rpm.

The films are cured 3 hours at 120° C. The thickness obtained is 3.7 micrometers.

Comparative Example 2

Elaboration of Films Loaded with Grafted Aluminasol®-200 Particles

8g Aluminasol®-200 are dispersed in 500 ml ethanol.

One adds then 7.4g glycidoxypropyltrimethoxysilane (Aldrich). The solution is then refluxed and stirred for a further 12 hours.

The solution thus obtained is purified by dialysis in ethanol, then concentrated to reach a 13%-mass dry extract. The solution is then reduced to a 3.5%-mass dry extract per addition of HMP(4-hydroxy, 4-methyl penta-2-one).

The dry extract, whereof the composition is determined by thermogravimetric analysis, comprises 84% in mass of particles for 16% in mass of grafted Glymo.

5.5 g. of this solution are added to 2 g of the Glymo hydrolysate A such as described in the comparative example 1, in order to obtain a final coating composition comprising Aluminasol®-200 particles representing 30% in mass of the TDE of this composition.

The solutions obtained are ultrasound-treated in order to optimise the dispersion of the colloids.

The glasses ORMA® acting as substrates for the deposit subjected to the following treatment: soda 15% for 3 minutes, mains water 3 minutes, de-ionised water for 3 minutes and isopropyl alcohol 3 minutes.

The deposits of the final coating composition are then carried out by spin coating at 1000 rpm.

The films are cured for 3 hours at 120° C. The thickness obtained is 4 micrometers

Mechanical Characterisation of the Films

The mechanical properties are compared with the scratch of the films loaded with the high form factor boehmite particles according to the invention and that of the films loaded with commercial particles of ALUMINASOL®-200, either non-grafted or grafted (comparative examples 1 and 2)

The scratches are obtained with conical diamond tips terminated with a spherical portion whereon a gradually increasing load is applied along the scratch. The characteristics of the device used for the scratching cycle are given thereunder.

Device used: SCRATCH TEST (MST SCEMEX®)

The specifications of the CSEM SCRATCH TEST (MST SCEMEX) are as follows:

The loading system is based on an electromagnetic coil and a spring-loaded arm system.

The load range: 10 mN-30N.

The instrument is equipped with an acoustic transmission detector and a tangential force measuring system.

Parameters used:

Radius of the indenter: 100 μm

Load increasing and loading speed constant throughout the scratching cycle.

Load: 0,1-15N.

Loading speed: 89 N/min

Length of the scratch: 10 mm

Above a certain load, regular cracks begin to appear at the scratch. This load is defined as the damage critical load, designated thereunder as the critical load.

Beyond this critical load, the scratch becomes quite clearly visibly to the naked eye, due to the optical effect of the cracks. The coated substrate is then damaged from the surface of the coating to the core of the substrate.

The apparition of regular cracks, and therefore the determination of the critical load, is visualised by observation of the scratch under optical microscope, at ×500 enlargement.

The measuring system used enables direct matching between the position along the scratch and the applied load.

Figure 3:
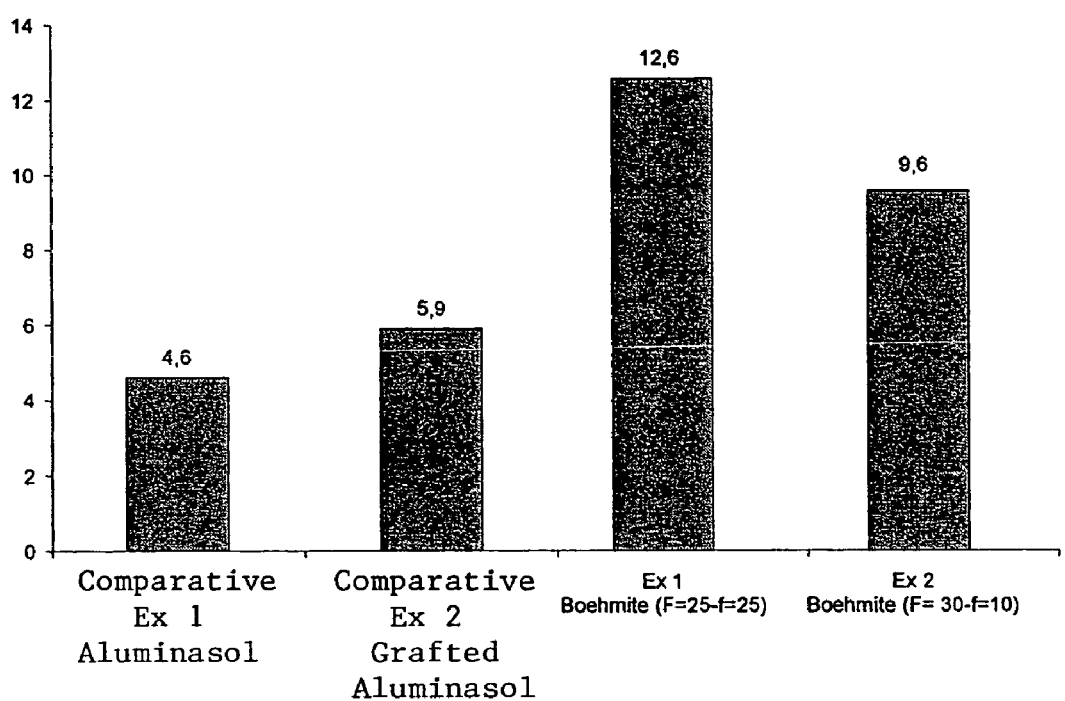

The results obtained are recorded in the table below and carried forward on FIG. 3.

| Nanoparticles | Critical load (in N) |
| --- | --- |
| Comparative example 1 Aluminasol ®-200 | 4.6 |
| Comparative example 2 Grafted Aluminasol ®-200 | 5.9 |
| Coating of the example 2 Boehmite (F = 30, f = 10) | 9.6 |
| Coating of the example 1 Boehmite (F = 25, f = 25) | 12.6 |

The invention claimed is:

1. An anti-scratch coating polymerisable composition comprising:
   a) at least one alkoxysilane and/or at least one hydrolysate thereof; and
   b) anisotropic particles of at least one metal oxide and/or of at least one metal oxyhydroxide, having a main axis and a length D1 following this main axis, smaller than or equal to 400 nm and whereof the sizes vary, in a direction transversal to said main axis, between a minimum dimension D2 and a maximum dimension D3, with D3≧D2;
   wherein the ratios F=D1/D2 and f=D1/D3 defining the form factors of said anisotropic particle verify the relation F>10 and f≧10, and
   wherein said metal oxide and/or metal oxyhydroxide is selected from the group consisting of oxides and oxyhydroxides of aluminum, zirconium, titanium, iron, tungsten, vanadium, and mixtures thereof.

2. The composition of claim 1, further defined as comprising a polymerisation catalyst.

3. The composition of claim 1, wherein $10 < F \leq 50$ and $10 < f \leq 50$.

4. The composition of claim 3, wherein $F \geq 15$.

5. The composition of claim 4, wherein $F \geq 20$.

6. The composition of claim 5, wherein $F \geq 25$.

7. The composition of claim 5, wherein $F \geq 30$.

8. The composition of claim 7, wherein $F \geq 35$.

9. The composition of claim 3, wherein $f \geq 20$.

10. The composition of claim 9, wherein $f \geq 25$.

11. The composition of claim 1, wherein D1 varies from 100 to 300 nm.

12. The composition of claim 11, wherein D1 varies from 140 to 300 nm.

13. The composition of claim 12, wherein D1 varies from 140 to 200 nm.

14. The composition of claim 1, wherein F and f are substantially identical.

15. The composition of claim 14, wherein the anisotropic particles are in the form of needles.

16. The composition of claim 1, wherein the anisotropic particles are in the form of laths.

17. The composition of claim 1, wherein said metal oxide is an aluminum oxide.

18. The composition of claim 1, wherein said metal oxyhydroxide is an aluminum oxyhydroxide AlOGH.

19. The composition of claim 1, wherein the anisotropic particles have been surface-treated in order to increase their solubility in alkoxysilane and/or hydrolysate thereof.

20. The composition of claim 19, wherein the surface treatment of the anisotropic particles comprises a grafting step of at least one organo-functional alkoxysilane.

21. The composition of claim 20, wherein the organo-functional alkoxysilane is an epoxysilane and/or a (meth)acryloxysilane.

22. The composition of claim 21, wherein the organo-functional alkoxysilane is γ-glycidoxypropyltrimethoxysilane and/or (3-methacryloxypropyl)trimethoxy silane.

23. The composition of claim 1, wherein the anisotropic particles are in the form of a colloidal solution.

24. The composition of claim 1, wherein the anisotropic particles are obtained by hydrolysis of a hydrolysable metal precursor and hydrothermal treatment.

25. The composition of claim 24, wherein the hydrolysable metal precursor is aluminum acrylate.

26. The composition of claim 24, wherein the hydrothermal treatment is performed in acid medium, in an autoclave, at a temperature comprised between 150° C. and 200° C.

27. The composition of claim 1, wherein the theoretic dry extract of said composition comprises from 0.1 to 39% in mass of anisotropic particles of metal oxide and/or of metal oxyhydroxide.

28. The composition of claim 27, wherein the dry extract of said composition comprises from 3 to 35% in mass of anisotropic particles of metal oxide and/or of metal oxyhydroxide.

29. The composition of claim 28, wherein the dry extract of said composition comprises from 10 to 35% in mass of anisotropic particles of metal oxide and/or of metal oxyhydroxide.

30. The composition of claim 1, wherein the alkoxysilane and/or the hydrolysate thereof is an epoxysilane.

31. The composition of claim 1, comprising at least one other globally isotropic metal oxide.

32. The composition of claim 1, wherein the composition is a coating on a substrate.

33. The composition of claim 32, wherein the coating has a thickness of 1 to 10 microns.

34. The composition of claim 33, wherein the coating has a thickness of 2 to 5 microns.

35. The composition of claim 32, wherein the coating has a critical load greater than or equal to 7N, when scratched by a diamond tip with a tip radius of 100 micrometers.

36. The composition of claim 35, wherein the coating has a critical load greater than or equal to 9N, when scratched by a diamond tip with a tip radius of 100 micrometers.

37. The composition of claim 36, wherein the coating has a critical load greater than or equal to 11N, when scratched by a diamond tip with a tip radius of 100 micrometers.

38. The composition of claim 32, wherein the substrate is an ophthalmic lens.

39. The composition of claim 32, wherein the substrate is a spectacle glass.

40. A method of preparing a substrate coated with a film comprising:

Obtaining a composition comprising:
At least one alkoxysilane and/or at least one hydrolysate thereof; and anisotropic particles of at least one metal oxide and/or of at least one metal oxyhydroxide, having a main axis and a length D1 following this main axis, smaller than or equal to 400 nm and whereof the sizes vary, in a direction transversal to said main axis, between a minimum dimension D2 and a maximum dimension D3, with $D3 \geq D2$ wherein said metal oxide and/or metal oxyhydroxide is selected from the group consisting of oxides and oxyhydroxides of aluminum, zirconium, titanium, iron, tungsten, vanadium, and mixtures thereof;
wherein the ratios $F=D1/D2$ and $f=D1/D3$ defining the form factors of said anisotropic particle verify the relation $F>10$ and $f \geq 10$;

obtaining a substrate;

coating the substrate with the composition; and hardening the composition into a film.

41. The method of claim 40, wherein said film has a thickness of from 1 to 10 microns.

42. The method of claim 41, wherein said film has a thickness of from 2 to 5 microns.

43. The method of claim 40, wherein said film shows, when scratched by a diamond tip with a tip radius of 100 micrometers, a critical load greater than or equal to 7 N.

44. The method of claim 43, wherein said film shows a critical load greater than or equal to 9 N.

45. The method of claim 43, wherein said film shows a critical load greater than or equal to 11 N.

46. The method of claim 40, wherein said substrate is an ophthalmic lens.

47. The method of claim 46, wherein said ophthalmic lens is a spectacle glass. respectively.

48. An anti-scratch coating polymerisable composition comprising:

a) at least one alkoxysilane and/or at least one hydrolysate thereof; and b) anisotropic particles of at least one metal oxide and/or of at least one metal oxyhydroxide, having a main axis and a length D1 following this main axis, smaller than or equal to 400 nm and whereof the sizes vary, in a direction transversal to said main axis, between a minimum dimension D2 and a maximum dimension D3, with $D3 \geq D2$;

wherein the ratios $F=D1/D2$ and $f=D1/D3$ defining the form factors of said anisotropic particle verify the relation $F>10$ and $f \geq 10$, and wherein the anisotropic particles are in the form of laths.

* * * * *

UNITED STATES PATENT AND TRADEMARK OFFICE
CERTIFICATE OF CORRECTION

| | | |
|---|---|---|
| PATENT NO. | : 7,560,508 B2 | |
| APPLICATION NO. | : 10/912283 | |
| DATED | : July 14, 2009 | |
| INVENTOR(S) | : Jérôme Douce et al. | |

It is certified that error appears in the above-identified patent and that said Letters Patent is hereby corrected as shown below:

In claim 18, column 15, line 25, delete "AlOGH" and insert --AlOOH-- therefor.

In claim 40, column 16, line 24, insert comma after "D3 ≥ D2".

In claim 47, column 16, line 50, delete "respectively.".

Signed and Sealed this

Fifteenth Day of September, 2009

David J. Kappos
*Director of the United States Patent and Trademark Office*